Sept. 27, 1938.　　　　H. K. KING　　　　2,131,562
BRICK AND TILE CUTTER
Filed Jan. 28, 1937　　　9 Sheets-Sheet 1
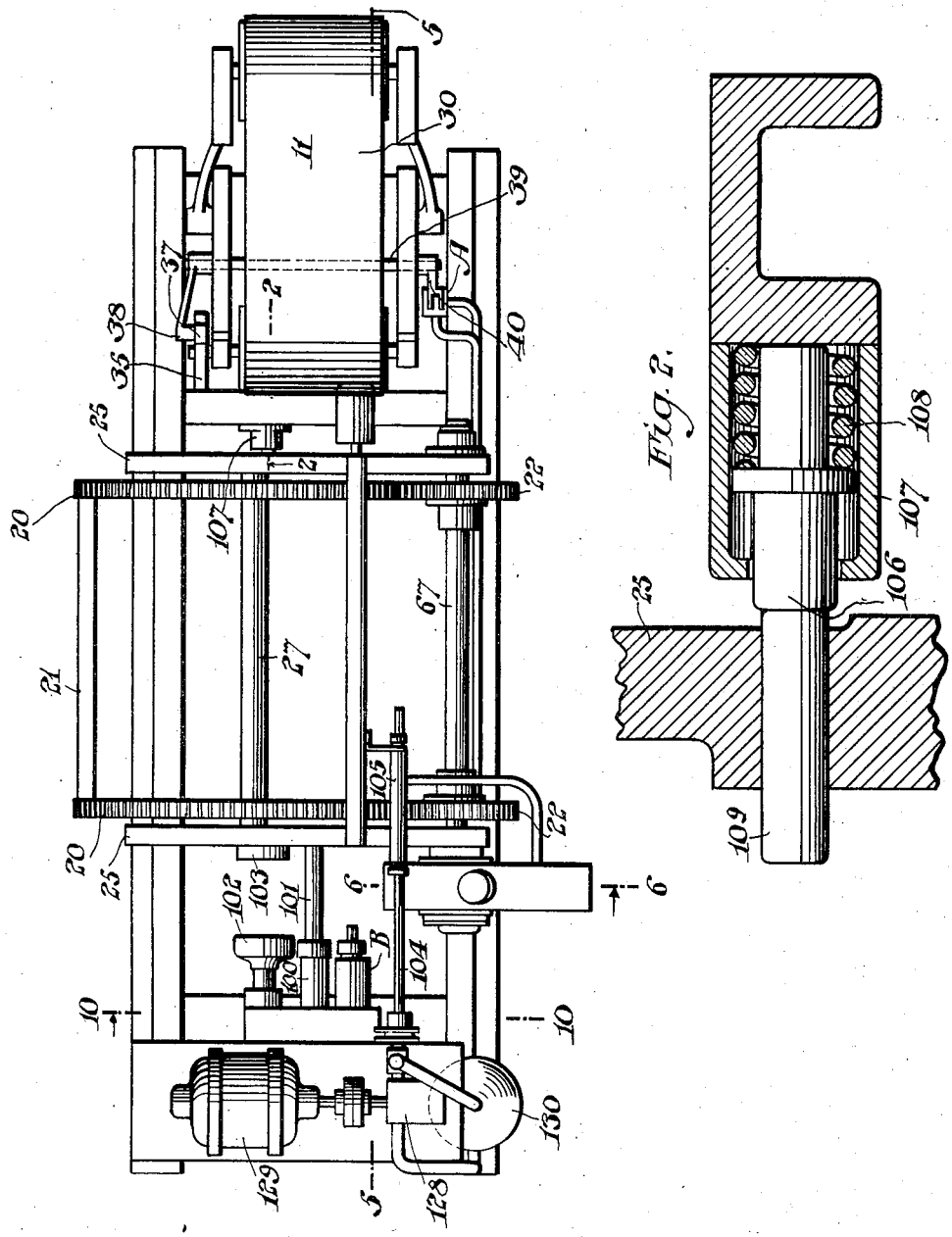
INVENTOR:
Howard K. King,
BY
ATTORNEY.

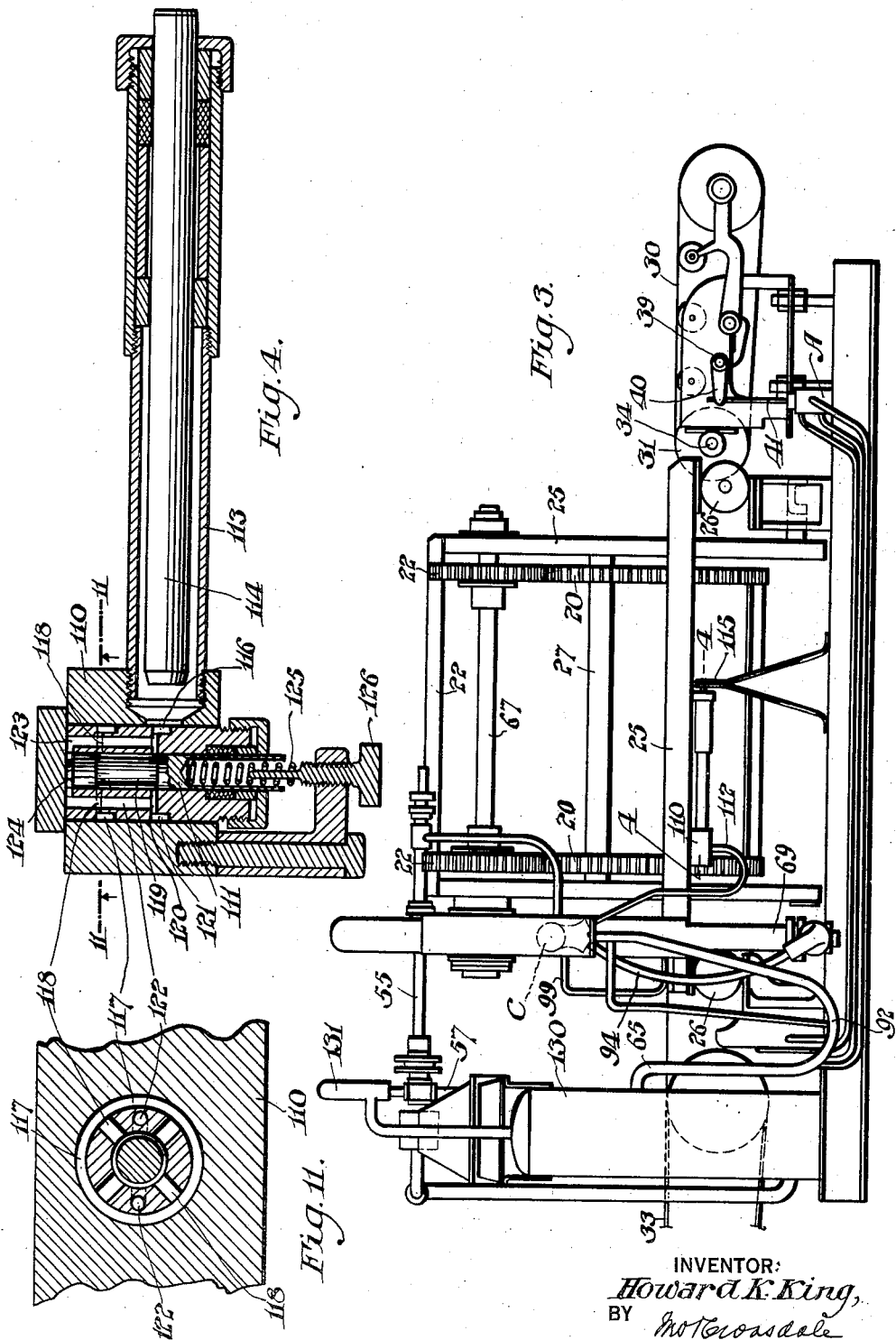

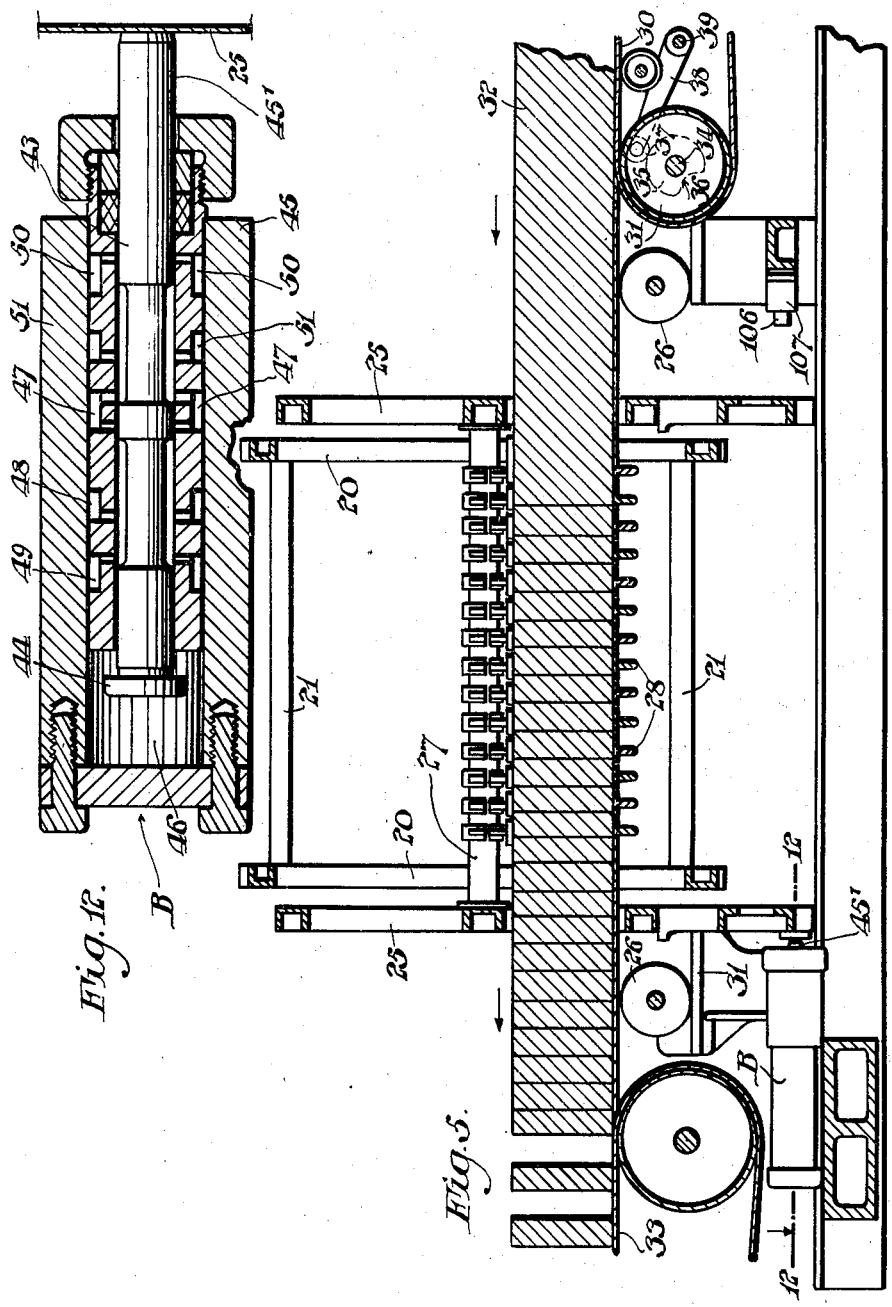

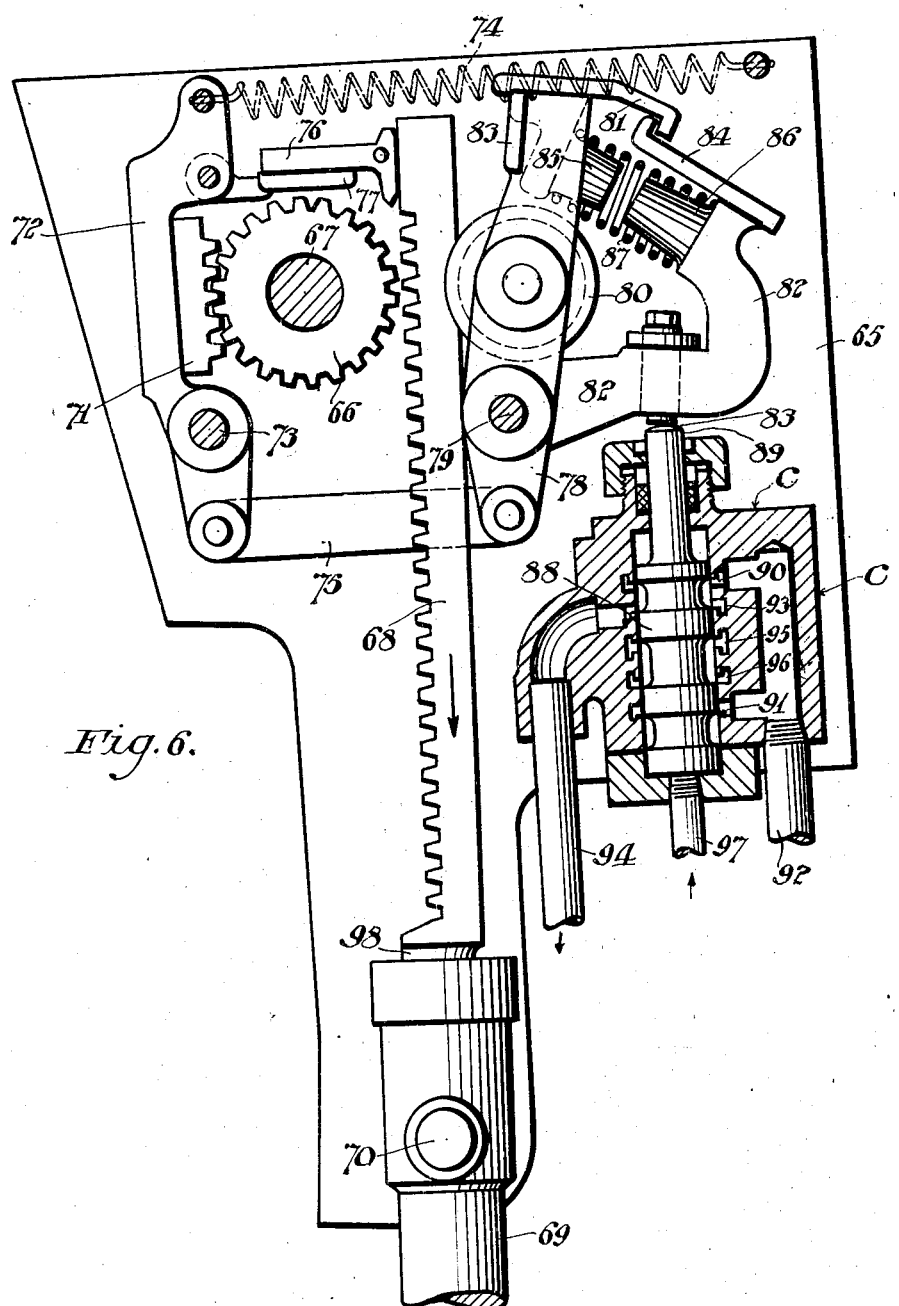

Sept. 27, 1938.  H. K. KING  2,131,562
BRICK AND TILE CUTTER
Filed Jan. 28, 1937  9 Sheets-Sheet 5

INVENTOR:
Howard K. King,
BY
Mo. Croasdale
ATTORNEY.

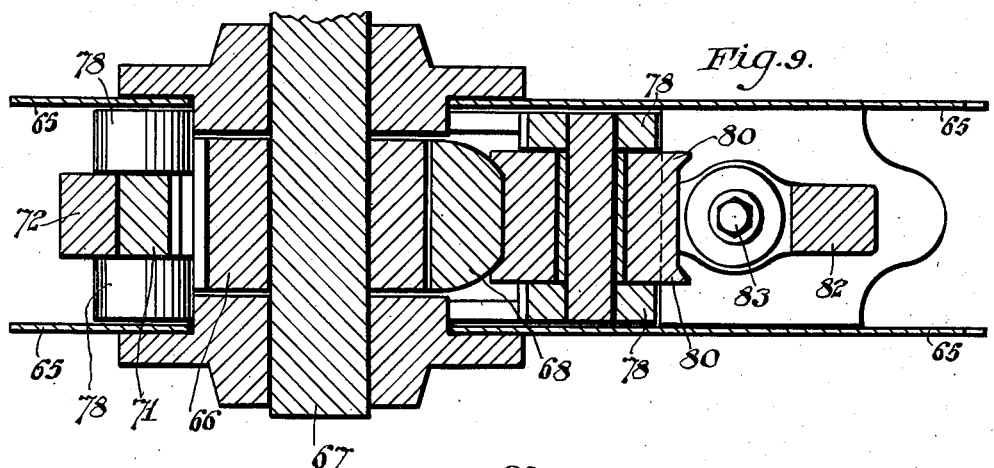
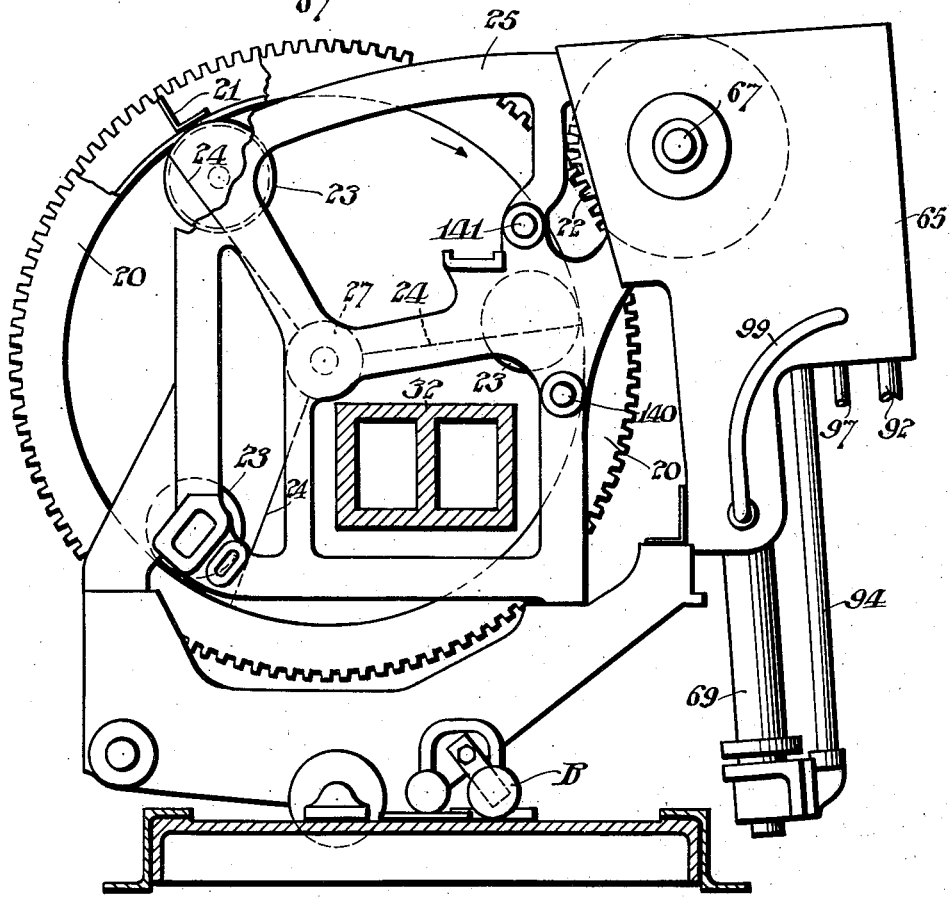

Sept. 27, 1938.  H. K. KING  2,131,562
BRICK AND TILE CUTTER
Filed Jan. 28, 1937  9 Sheets-Sheet 8

INVENTOR:
Howard K. King,
BY
Jno. Croasdale
ATTORNEY.

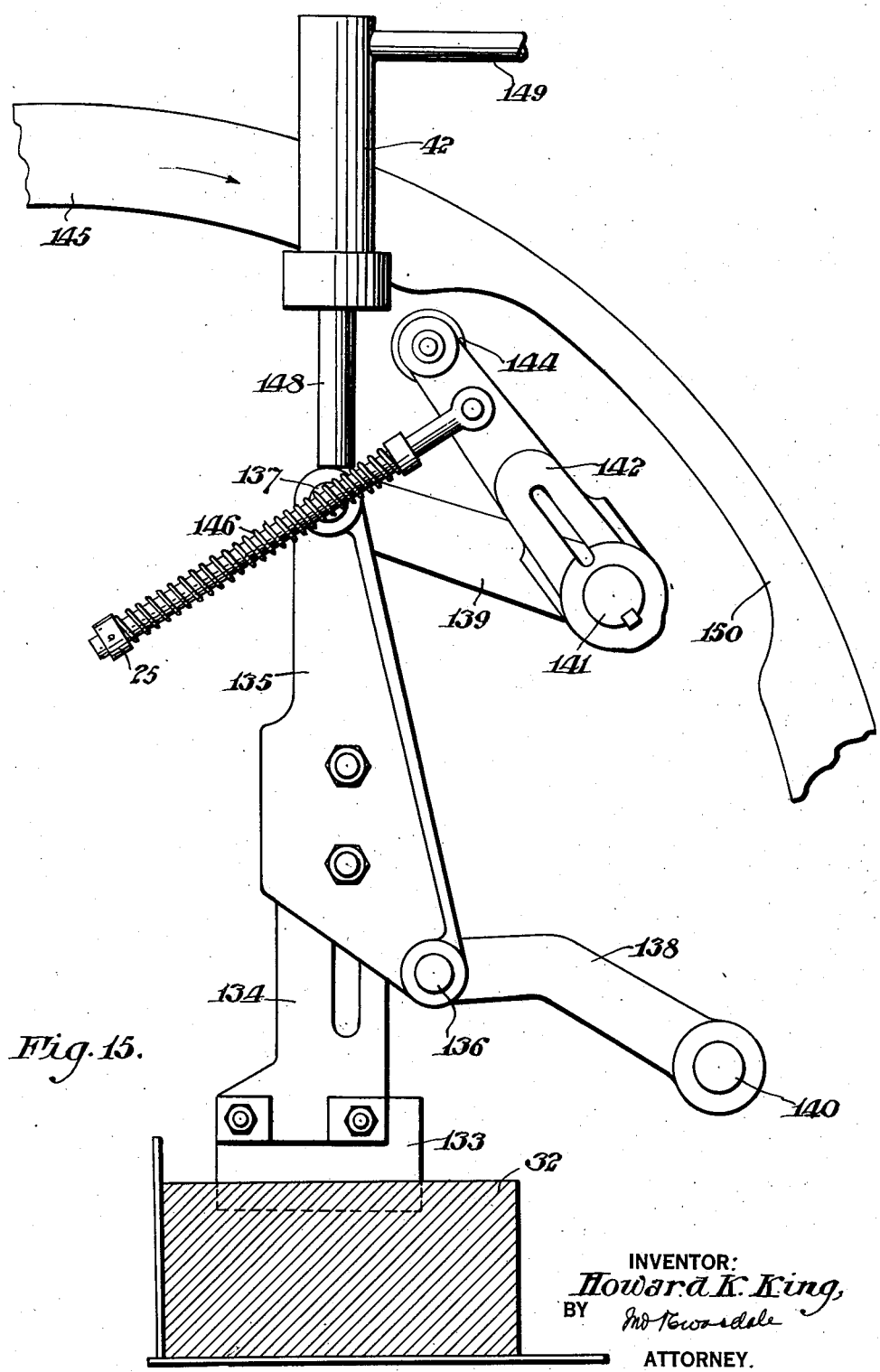

Patented Sept. 27, 1938

2,131,562

UNITED STATES PATENT OFFICE 2,131,562

BRICK AND TILE CUTTER

Howard K. King, Philadelphia, Pa., assignor to Chambers Brothers Company, a corporation of Pennsylvania Application January 28, 1937, Serial No. 122,757

20 Claims. (Cl. 25—109)

This invention relates to improvements in cutters used for cutting brick and tile, often called "multiple cutters". This type of cutter comprises an intermittently revolving reel mounted on a reciprocating reel carriage. During the forward stroke of the carriage, the bar of clay, supported on the platen, is cut into a number of pieces. In order to make a right angle cut, the clay bar and cutting wires must travel forward at the same speed. The reel carrying the cutting wires makes a partial revolution and comes to rest. It is during this rest period that the carriage with the reel and platen return and come to rest at the starting position. As the bar of clay moves continuously, the return movement of the platen is in direction opposite to the direction of movement of the clay bar which will slide over the platen.

The present invention comprises improved method and means for reciprocating the reel carriage, and improved means for operating the reel in its rotative movements, said moving means being so disposed and controlled as to synchronize with the movement of the clay bar.

The invention includes means, controlled by the clay bar, for starting the horizontal travel of the reel carriage and the rotative movement of the reel.

The invention also comprises improved means for overcoming inertia in starting the forward movement of the carriage, means for boosting the continuing movement of the carriage, after said initial starting, and adjustable means for regulating the boosting energy to supplement, in the required degree, the action of the clay bar upon the platen; so that the energy communicated to the carriage by the action of the clay bar upon the platen, and the action of the booster upon the carriage, may be properly coordinated, without putting undue strain upon the clay bar. By such an arrangement the swelling of the clay bar, which sometimes occurs in the present practice, is avoided.

The invention also comprises, an improved clamping device for clamping the clay bar to the platen during the cutting operation.

These various means include hydraulically operated valve controlled pistons, or plungers. The said valves are so connected and correlated, and so interact as to secure the proper relative timing of the several hydraulically operated devices.

Referring to the drawings, which illustrate, merely by way of example, suitable means for effecting the invention;—

Fig. 1 is a plan view of the machine with the carriage and cutting reel in the rear, or starting position.

Fig. 2 is a section on the line 2—2 of Fig. 1, on an enlarged scale, showing the send-off spring under compression.

Fig. 3 is a side elevation of the machine with the carriage and cutting reel in the rear, or starting position.

Fig. 4 is a section on the line 4—4 of Fig. 3, also on an enlarged scale.

Fig. 5 is a section on the line 5—5 of Fig. 1, on an enlarged scale.

Fig. 6 is a section on the line 6—6 of Fig. 1, on an enlarged scale.

Fig. 9 is a section on the line 9—9 of Fig. 7, on a slightly enlarged scale.

Fig. 10 is a section on the line 10—10 of Fig. 1, on an enlarged scale.

Fig. 11 (Sheet 2) is a section on the line 11—11 of Fig. 4, on an enlarged scale.

Fig. 12 (Sheet 3) is a section on line 12—12 of Fig. 5, on an enlarged scale.

Fig. 15 is a fragmentary view showing the clamping device operating upon the clay bar, also on an enlarged scale.

Similar numerals refer to similar parts throughout the several views.

Figure 7:
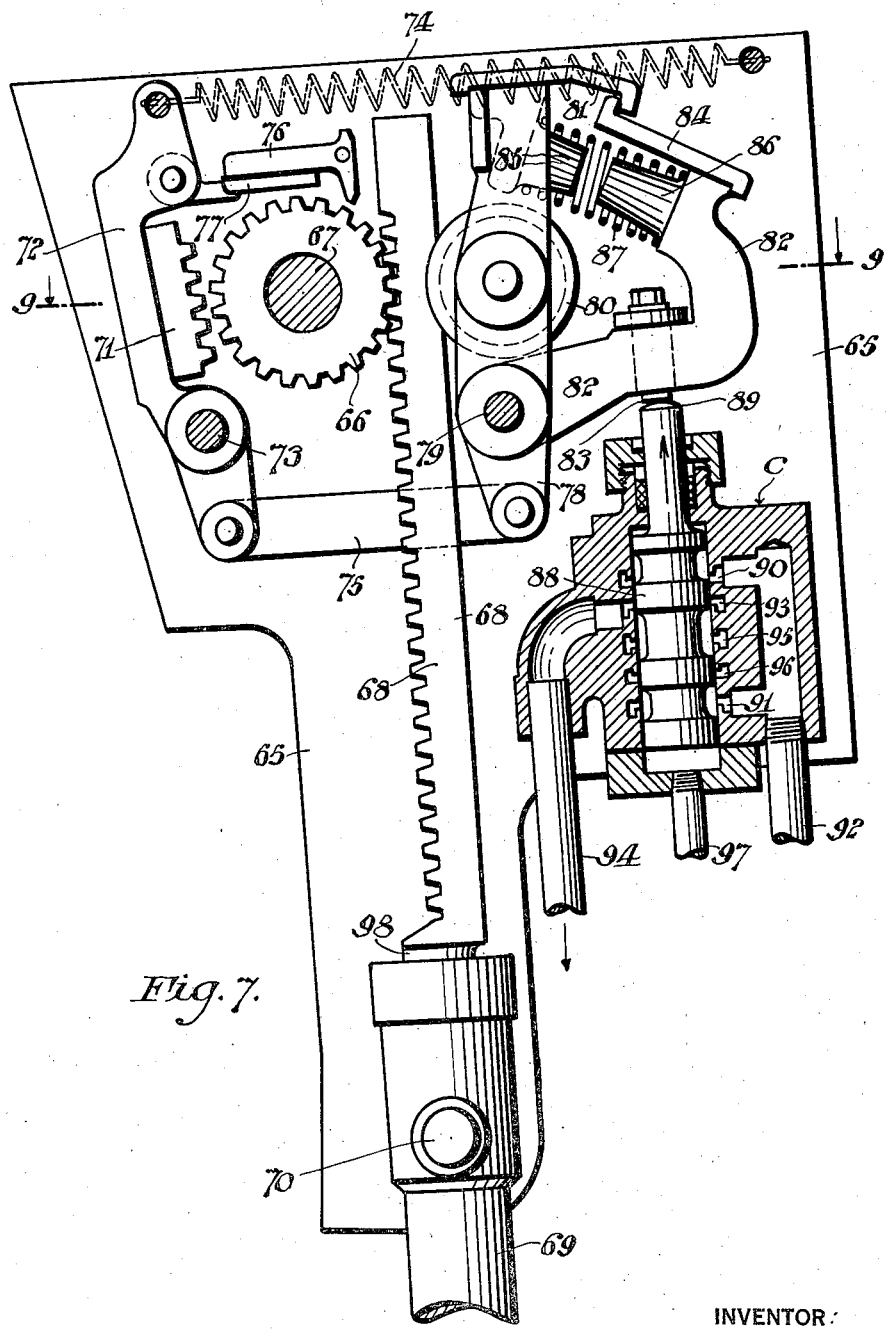
Fig. 7 is a view similar to Fig. 6, with the parts in different positions.
Figure 8:
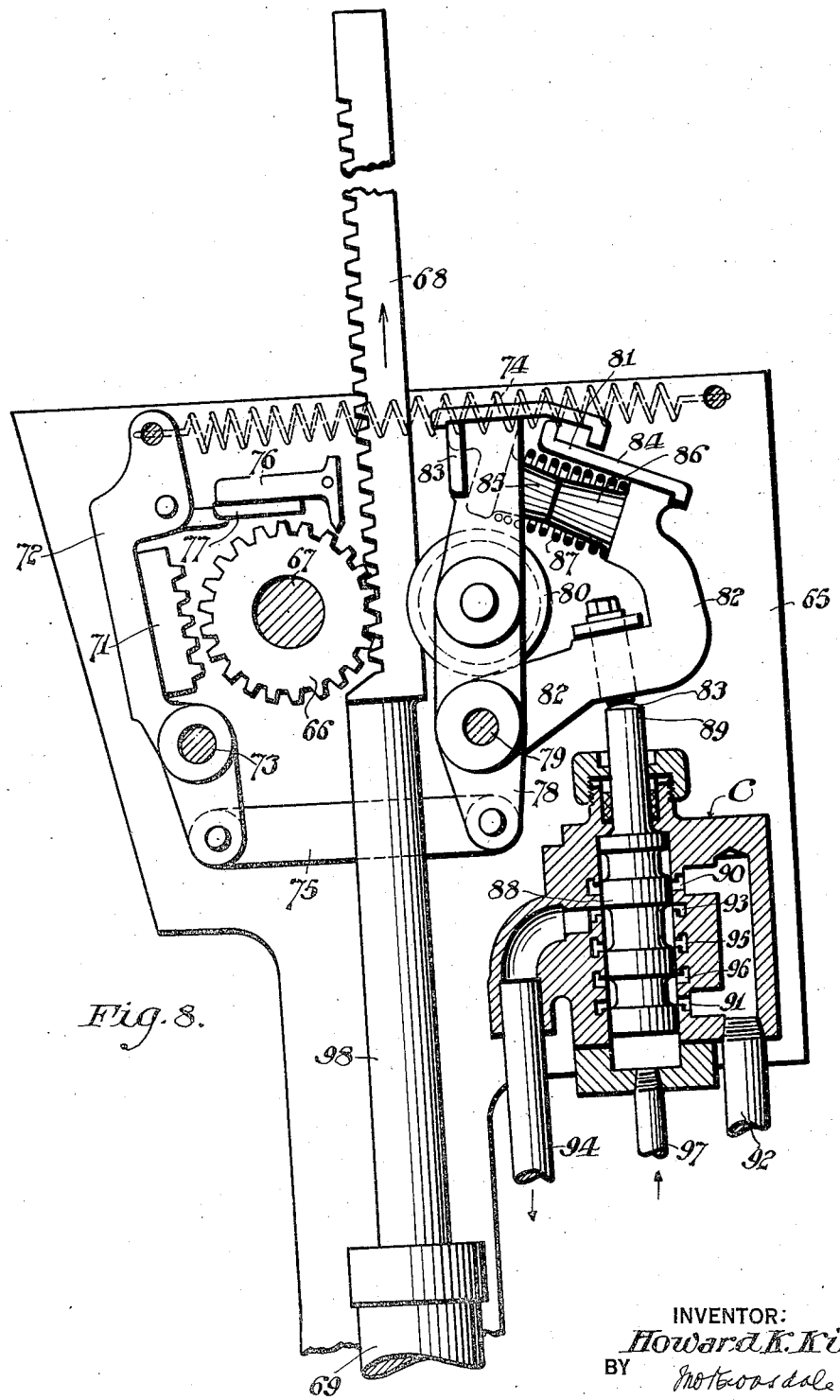
Fig. 8 is a view similar to Fig. 6, with the parts in still different positions.

In the present example the cutting reel is of usual form comprising the rings 20 secured together by the cross-bars 21 and provided with peripheral teeth meshing with the driving pinions 22, see Figs. 1, 3, 5 and 10. The reel is supported on the rollers 23, and is provided with three equi-distant rows of wires 24. The number of wires comprised in the row will depend upon the number of cuts desired with each cycle.

The reel supporting rollers 23 are mounted on the carriage frame, parts of which are indicated by the numeral 25. This frame is supported and adapted to reciprocate on rollers, such as 26. A fixed shaft 27 is carried by the carriage and supports the platen 28 and also the rings 29 connected to one end of each of the wires 24.

This arrangement may all be in accordance with the common practice.

The measuring belt 30, Figs. 3 and 5, passing around the measuring or regulating pulley 31, carries the clay bar 32 from the extruding die not shown, to the platen 28. The severed portions of the clay bar are delivered to the carry-off belt 33, also in accordance with the usual practice.

Upon the shaft 34 of the regulating pulley 31 is secured a cam 35 having the depression 36 for receiving the roller 37 on the arm 38 secured to shaft 39, see Fig. 5, provided with the lever 40 connected by rod 41 to a piston valve in the valve formation A, see Fig. 3. It will be convenient to refer to this formation, including valve and housing, as valve A, or trip-off valve A. A complete revolution of the pulley 31 represents a cycle of the machine. This trip-off valve A is of the well known balanced type of hydraulic valve. When the cam roller 37 is on the large diameter of cam 35 the valve is held up and the exhaust port is open, that is the passage through valve A is open between the piston end of the main control valve B and the exhaust. When the roller 37 is in the depression 36 the valve A is in the down position and the passage through valve A is from the pressure line to the piston end of valve B. A cylinder 42, for the clamping plunger herein described, is also connected to the pressure and exhaust pipes controlled by the trip-off cylinder A. It will be understood that suitable piping connects the pressure and exhaust ports of valve A with valve B, and also that suitable piping connects valve A with the pump or pressure line and with the exhaust tank. It will be noted that the opening of the valve A to the pressure line is only momentary, during the co-operation of roller 37 with recess 36. During the balance of the rotation of cam 35 the roller 37 engages the enlarged part of the cam during which time the valve A is lifted, which opens valve B to the exhaust.

In other words the trip-off valve A is a convenient means for communicating the power from the cam action on the regulating pulley shaft to valve B. The same action could be secured with bell-cranks and a rod. The distance apart of the controlling elements makes the use of the valve A desirable. Valve B is the main controlling valve. It is shown in Figs. 5 and 12. It comprises a cylindrical housing 45 with a number of ports and chambers, and a plunger valve 43 having a headed end 44 operating in chamber 46 of the housing. The other end 45' of the plunger projects from the other end of the housing. This valve B is secured to a stationary part of the machine to the left of the carriage, as shown in Fig. 5. The projecting end 45' of plunger valve 43 is adapted to be engaged by the reel carriage at the end of the outward stroke, and thus be returned to initial position. The housing of valve B is provided with a number of chambers and ports. Chamber 46 for example, is adapted to be connected through trip-off valve A either with the pressure line or with the exhaust. Other ports or chambers are so disposed with respect to the valve formation, as to connect with exhaust or pressure, as required, the return cylinder and plunger, and the valve C controlling the rack and pinion actuation of the reel, as herein to be described.

For example, chamber or port 47 connects the pump or pressure line 48 to valve C, ports 49 and 50 to exhaust, and port 51 to return cylinder. When trip-off valve A is down it opens pressure to chamber 46 of valve B. This pressure pushes piston 43 out as far as it will go and connects valve C to pressure, and connects return cylinder to exhaust. When piston 43 is pushed back by the engagement therewith of the carriage 25, valve C is open to exhaust, and the cylinder having the return plunger is connected to the pressure line to cause its actuation.

*Rotating the cutting reel*

As above stated the cutting reel is provided with three equally spaced rows of cutting wires. It is actuated so that the row of wires must cut entirely through the clay bar in somewhat less than one-third of a revolution, and so that the reel must come to rest in a definite position after each cutting, and held so until the platen has been returned to initial position. For this purpose the following mechanism has been provided, referring especially to Figs. 6 to 10 inclusive.

The mechanism is mounted between side plates or frames 65 of a housing which is secured to and supported by the reel carriage 25. A pinion 66 is mounted on a shaft 67 carrying pinions 22, geared directly to the reel rings 20, see Fig. 1. A rack 68 is connected to a plunger operating in a cylinder 69 pivoted to the side plates or frame 65 as at 70. This rack is adapted to engage with and to actuate the pinion 66. A pinion lock 71 is mounted on the arm 72 pivoted at 73. A spring 74 is connected between the upper end of arm 72 and the housing frame. The lower end of arm 72 is pivotally secured to the connecting member 75. A shoe 76 is adjustably attached to member 77 which, in turn, is pivoted to the locking arm 72, and serves normally to cause the disengagement of the rack 68 in response to the tension of springs 74. That is when the roller is in position shown in Fig. 6.

The connecting member 75 is pivotally secured, at its other end, to the arm 78, pivoted at 79 and carrying the grooved roller 80, said roller receiving in its groove, the rack 68, permitting its longitudinal movement in said groove but controlling its pivotal movement about the pivot 70, into and out of cooperative engagement with the pinion 66. The pivoted arm 78 is provided at its upper end with a stop member 81 to be described. The arm 82 is also pivoted at 79, and is provided with the adjustable contact screw 83. The outer end of lever 82 is provided with a stop element 84 for cooperation with the stop element 81 to limit the separating movement of arms 78 and 82. The said arms 78 and 82 are each provided with a tapered end 85 and 86, directed toward each other, and provided with a spiral spring 87 extending over said tapered ends and tending to hold said ends in spaced relationship.

Also secured in the housing or frame element 65, is a valve assembly designated C. This valve comprises a double acting plunger valve element 88. This plunger 88 has an end 89 projecting through the housing of C and engages the contact screw 83. The valve assembly is provided with the ports 90 and 91 which are connected with the exhaust pipe 92; with port 93 connected with pipe 94 leading to the lower end of cylinder 69, and with ports 95 and 96 connected to the upper end of cylinder 69. The pipe 97 leads from the bottom of valve chamber beneath the plunger 88 to port 48 of valve B.

With the parts in positions shown in Fig. 6, the plunger valve 88 is all the way down, with the space below the plunger connected through the ports 48 and 49 of valve B. with the exhaust.

In this position of the plunger 88, the rack 68 is disengaged from pinion 66 which is locked from rotation by the locking member 71. The plunger 98, see Fig. 13, carrying rack 68, is also in lowest position in cylinder 69.

Fig. 7 shows the positions assumed by the parts when plunger 88 starts to rise upon introduction of pressure through pipe 97 beneath the plunger. It will be noted that in this position of plunger 88, the port 93, for delivering pressure to the lower end of cylinder 69 has not yet opened, so that rack 68 has not yet begun to move upwardly to drive pinion. It will be noted that the locking element 71 has been disengaged from the pinion, but that the engagement of the rack and pinion is only a resilient engagement, afforded by the spring 87. In the position shown in Fig. 8 the plunger 88 has made its full upward stroke, bringing the two ends 85 and 86 of the arms 78 and 82 into positive engagement and thereby locking the rack and pinion in positive engagement, whereupon at the same time opening the pressure port 93 to cause the upward stroke of the rack as shown. This arrangement insures the positive engagement between rack and pinion before plunger 98, in cylinder 69, starts to move. Upon the return or down stroke of plunger 88 to position shown in Fig. 6, the rack is disengaged from the pinion, and port 96 is open to deliver pressure through pipe 99, see Fig. 13, to the upper end of cylinder to return the plunger 98 and rack 68 to initial position. The said movements of plunger 88 being controlled by the controlling valve B as described. The piston on the end of plunger 98 is tapered both ways to provide a hydraulic cushion for the rack at each end of its stroke.

Return cylinder

The cylinder 100 is secured to a stationary part, see Fig. 1, and is provided with a plunger 101 adapted to engage the carriage 25 and return the same to its original position. During the outward, or cutting stroke of the reel carriage, the end of the cylinder 100 is connected to exhaust through ports 50 and 51 of valve B. When the piston valve 43 is returned to initial position by the engagement of carriage 25 with the outer end 45' of piston 43, pressure is communicated to the rear of plunger 101 in cylinder 100 first to cushion and then to drive the plunger forward and return the carriage to initial position.

An air cushioning device is provided for arresting the outward movement of the carriage, comprising the cup 102 and plunger 103. Other air and hydraulic cushioning means are used where required.

Figure 13:
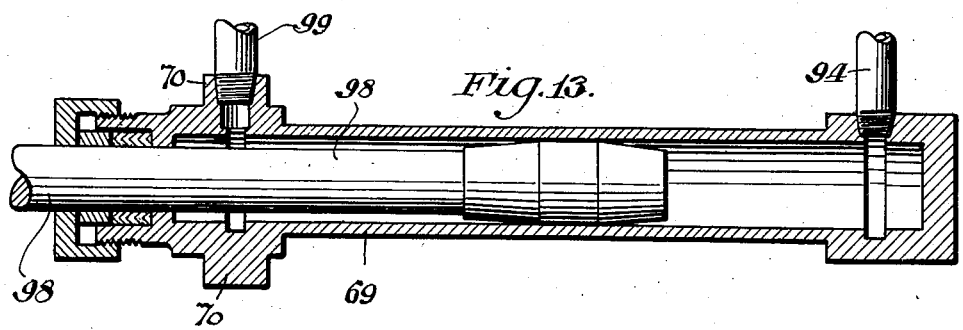
Fig. 13 is a longitudinal section through the rack-actuating cylinder 69, cup leathers or piston rings being omitted.
Figure 14:
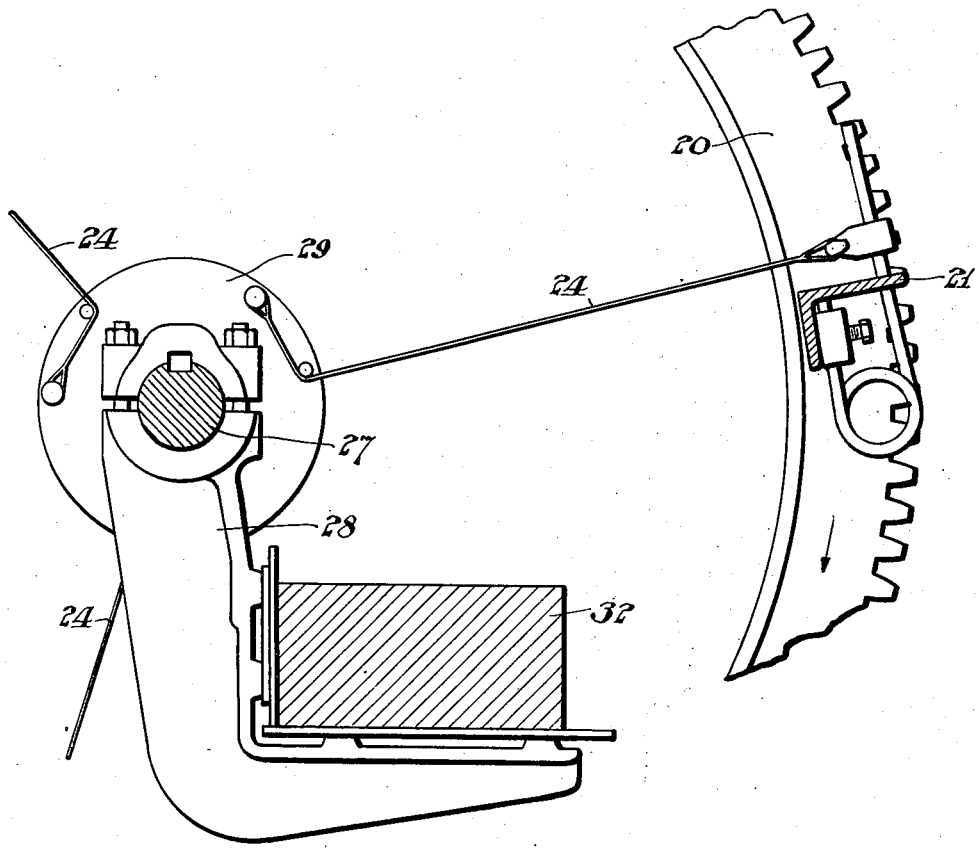
Fig. 14 is a fragmentary section, showing the platen, cutting wires and associated parts, in position of rest after a cut, the view being on an enlarged scale.

It will also be understood that the hydraulic cylinders and plungers may be so formed as to provide cushioning or shock absorbing means whenever the same are required. For example, the formation of the plunger end of plunger 98, shown in Fig. 13, provides such means.

The telescoping pipes 104 and 105 in the pressure line permit the back and forth travel of the reel carriage while maintaining suitable hydraulic connection therewith.

Actuation of reel carriage

As above stated, the clay bar 32 is delivered over the regulating belt 30 on to the platen which is supported by the carriage. The bar will slide over the platen which is held against movement by the return plunger 101, until the bar has assumed the position to be cut. At this point, valve A is actuated to deliver pressure to valve B, which in turn connects the return plunger cylinder with the exhaust and permits the plunger 101 to move back into its cylinder 100 and the platen to travel with the clay bar, due primarily to friction between the clay bar and the platen.

To overcome inertia in starting the travel of the carriage with the clay bar, when the pressure behind plunger 101 is withdrawn, a strong spring actuated piston 106 is provided, see Fig. 2, operating in a housing 107 and actuated by the spring 108. This piston 106 engages a hardened pin 109 fixed in the carriage frame 25.

This device serves to give the initial start of the forward movement of the carriage, which movement is usually continued by the action of the clay bar upon the platen.

The booster

In order to supplement the actuating force delivered to the carriage, by the frictional engagement of the clay bar with the platen, after the initial action of the spring plunger 106, a booster device is provided to cooperate with said clay bar actuation for continuing the forward movement of the carriage, after the inertia has been overcome by the action of said spring piston 106. Booster action starts with the opening of port 93 in valve C. See Fig. 8 for the opening of the port.

Referring to Figs. 3, 4 and 11, a valve housing 110 is secured to and supported by the reel carriage 25. This housing is provided with a valve 111 for controlling the pressure delivered through piping 112 from the pressure line and exhaust controlled by valve C. Secured to housing 110, is the cylinder 113 in which operates the plunger 114, which is adapted to engage, at its free end, with a stationary frame 115. The port 116 establishes communication between the valve controlled ports and the cylinder 113. When pressure is delivered to cylinder 113 by the pipe line 112, the plunger 114 will be forced outwardly against the stationary frame 115; this action will move, or tend to move the reel carriage forward, that is, to the left, in Fig. 3. It is evident that if just the right amount of pressure is applied, it will balance the friction of the reel carriage, so that very little pressure of the clay bar is needed to push it forward, or if more fluid pressure is used it will pull the clay bar. To secure this adjustable result, the area of the plunger 114 must be sufficient to do the required work at a less pressure per square inch than is used in pipe 112 of the pressure line. The pipe 112 delivers to annular groove 117. A series of holes 118 deliver from groove 117 to the inside of the cylinder in which the plunger valve 111 operates. A reduced portion 119 of the plunger valve 111 provides a passage for the fluid to flow to the series of holes 120, which connect with the annular groove 121.

In the position shown in Fig. 4, there would be a free flow of liquid from groove 117 to groove 121, which latter groove is open to the cylinder 113. With the piston valve 111 held in this position, the plunger will receive full pressure from the pressure line.

At least two holes or channels 122 are provided to connect the annular channel 121, to the small chamber 123 at the top of the cylinder. The pressure flowing in the annular channel 117 will deliver through the holes 118 and passage 124, to holes 120, to holes 122 and chamber 123. This will tend to force the piston valve 111 against a spring 125 and close or partially close the holes 118. Holes 118 do not connect directly with holes 122. It will be obvious that, if the spring is weak enough, the holes 118 will be entirely closed, or, if strong enough, the piston valve 111 can be held open against the pump pressure, in which case the plunger would receive the full pressure of the pump or pressure line.

Using spring 125 of the proper strength or tension with the use of the manually adjusting screw 126, the desired tension can be given the spring to secure the required pressure on the plunger 114. Holes or passages 118 will carry the pump pressure at all times, while holes or passages 120, 122 and chamber 123 will carry the pressure given to the plunger 114. The adjusting screw 126 may be manipulated while the cutter is in operation so that the desired supplementary power may be secured.

Clamping device

In order to prevent the slipping of the clay bar on the platen during the forward or cutting movement of the reel carriage, a clamping device is provided for engaging that part of the clay bar which becomes the slab or waste end, after the completion of the cutting operation.

Such a device is illustrated in Fig. 15 of the drawings, and comprises the blade 133 adapted to be forced into the clay bar 32 at either end of the reel 20, and into the portion that becomes the waste slab. The purpose is to insure the bar of clay and the reel traveling at the same speed during the cutting period. The blade 133 is secured to the blade holder 134 which is adjustably secured to the member 135. The member 135 is pivotally secured at 136 and 137 to the arms 138 and 139. The arm 138 is pivoted to the reel carriage at 140, see Figs. 10 and 15, while arm 139 is secured to a shaft 141, to which the arm 142 is also secured, said arm 142 is provided with a roller 144 for cooperating with a cam 145, and with a controlling spring 146. The cam 145 is secured to one of the ring gears 20, of the reel and turns only when the reel turns. A hydraulic cylinder 42 is provided, having a plunger 148 for actuating the clay bar clamp downwardly just before the reel starts to revolve. A pipe 149 leads from cylinder 42 to a branch of the pipe connecting valve A with valve B. When valve A acts upon this line the spring 146 develops sufficient resistance to cause the piston in valve B to move outwardly to the limit of such movement provided by the head 44, before the plunger 148 forces the clamp down, as shown in Fig. 15. This Fig. 15 shows the parts in the position they would assume just after the cam 145 has started to revolve in the direction of the arrow. The plunger 148 will have forced the blade into the clay bar to the limit of its downward movement. The plunger holds the clamp in this position until the cam takes up the work. When the cutting is completed, and just before the reel comes to rest, the cam permits the spring to withdraw the clamp blade and the plunger. There are three depressions 150 in the cam.

It is obvious that the cam would cause the clay clamp to act without the hydraulic plunger. The advantage of the hydraulic action is to get an earlier action of the clamp.

Other details

The pressure of liquid, preferably oil, is maintained in the various pressure lines, by the pump 128, driven by the motor 129. The return of the oil from the several exhausts is received by the tank 130, from which the pump draws its supply.

The proper working pressure in the pressure lines is maintained by the adjustable relief valve, such as 131, Fig. 3. Flexible pipes or tubes are used to connect moving parts with the pump.

What I claim is:—

1. In a device of the character described, the combination of a measuring pulley having a cam rotating therewith, a revolving cutting reel, a reciprocating reel carriage, hydraulic means for actuating the reel, and a hydraulic valve actuated by the cam for controlling the reel actuating means.

2. In a device of the character described, the combination of a measuring pulley having a cam rotating therewith, a revolving cutting reel, a reciprocating reel carriage, hydraulic means for actuating the carriage, and a hydraulic valve actuated by the cam for controlling the carriage actuating means.

3. In a device of the character described, the combination of a measuring pulley having a cam rotating therewith, a revolving cutting reel, a reciprocating reel carriage, hydraulic means for returning the reel carriage to initial position, and a hydraulic valve actuated by the cam for controlling said return movement.

4. In a device of the character described, the combination of a revolving cutting reel, a reciprocating reel carriage, a hydraulically operated booster for contributing supplementary force to the carriage after its initial start in its forward movement.

5. In a device of the character described, the combination of a revolving cutting reel, a reciprocating reel carriage, a hydraulically operated booster for contributing supplementary force to the carriage after its initial start in its forward movement, and means for arbitrarily regulating said supplemental force.

6. In a device of the character described, the combination of a measuring pulley, a revolving cutting reel, a reciprocating reel carriage, a hydraulically operated booster for contributing supplementary force to the carriage after its initial start in its forward movement, means for arbitrarily regulating said supplemental force, and a hydraulic valve, controlled by the measuring pulley, for controlling the action of the booster.

7. In a device of the character described, the combination of a revolving cutting reel, a reciprocating reel carriage, valve controlled hydraulic means for actuating the reel carriage, a clamping element, a cam mounted on and rotating with the reel, and a hydraulically actuated device, said cam and said hydraulically actuated device cooperating in the control of the clamping element.

8. In a device of the character described, the combination of a measuring pulley having a cam rotating therewith, a revolving cutting reel, a reciprocating reel carriage, hydraulic pressure lines and valve controlled means, connected to said pressure lines, for actuating the reel and the carriage, including a trip valve actuated by the cam.

9. In a device of the character described, the combination of a measuring pulley, a revolving cutting reel, a reciprocating reel carriage, means for actuating the reel, comprising a rack and pinion, a hydraulic plunger for reciprocating the rack, means for causing rack and pinion engagement and disengagement, means for locking the pinion against rotation and a valve piston and associated mechanism for controlling the rack and pinion engagement and disengagement and the locking means.

10. In a device of the character described, the combination of a measuring pulley, a revolving cutting reel, a reciprocating reel carriage, hydraulic actuating means for rotating the reel including a plunger actuated rack, a cooperating pinion, a lock for the pinion, spring means effective in respect to pinion, rack and lock engagements, levers acting in connection therewith, and a valve piston actuated to effect first a spring pressure engagement of rack with pinion and then a positive engagement of same.

11. In a device of the character described, the combination of a measuring pulley, a revolving cutting reel, a reciprocating reel carriage, hydraulic actuating means for rotating the reel including a plunger actuated rack, a cooperating pinion, a lock for the pinion, spring means effective in respect to pinion, rack and lock engagements, levers acting in connection therewith, and a valve piston actuated to effect first a spring pressure engagement of rack with pinion and then a positive engagement of same, said valve piston at the same time controlling the power to the plunger with respect to said two-stage engagement.

12. In a device of the character described, the combination of a measuring pulley, a hydraulically operated cutter reel and reciprocating reel carriage, a hydraulic pressure line, a trip-off valve connected therewith, a cam rotating with the measuring pulley for controlling the trip-off valve, and a main controlling valve controlled by the trip-off valve for controlling the hydraulic operating means.

13. In a device of the character described, the combination of a measuring pulley, a hydraulically operated cutter reel and a reciprocating reel carriage, a hydraulic pressure line, a trip-off valve connected therewith, a cam rotating with the measuring pulley for controlling the trip-off valve, and a main controlling valve controlled by the trip-off valve for controlling the hydraulic operating means, said main controlling valve having a valve-plunger adapted to be actuated by the reel carriage engagement therewith.

14. In a device of the character described, the combination of a measuring pulley, hydraulically operated cutter reel and reciprocating reel carriage, a cylinder and a carriage return plunger operating therein, said cylinder having valve controlled connection with pressure and exhaust ports, said cylinder and return plunger adapted to form a hydraulic cushion for arresting the carriage at the end of its working stroke.

15. In a device of the character described, the combination of hydraulically operated cutter reel and reciprocating reel carriage, a booster for communicating auxiliary force to the carriage during part of its working stroke, comprising a cylinder and plunger operating therein, and adjustable means for regulating the pressure admitted to said cylinder.

16. In a device of the character described, the combination of a measuring pulley, a revolving cutting reel, a reciprocating reel carriage, means for actuating the reel, comprising a rack and pinion, a hydraulic plunger for reciprocating the rack, means for causing rack and pinion engagement and disengagement, means for locking the pinion against rotation and a valve piston and associated mechanism for controlling the rack and pinion engagement and disengagement and the locking means, said valve piston also operating to control the pressure on the rack plunger to withdraw the rack after its disengagement from the pinion.

17. In a device of the character described, the combination of hydraulically operated cutter reel and reciprocating reel carriage, mechanism for clamping the clay bar to the carriage comprising a clamping element and a clamp actuating cam rotating with the reel.

18. In a device of the character described, the combination of hydraulically operated cutter reel and reciprocating reel carriage, means for overcoming inertia of the carriage when starting on its working stroke, comprising a spring actuated piston, adapted to come into action upon the withdrawal of the opposing force of the carriage actuating means.

19. In a device of the character described, the combination of a regulating pulley, a revolving cutting reel, a reciprocating carriage and means for actuating the operating parts comprising hydraulic pressure and exhaust lines, a trip-off valve controlled by the regulating pulley, a main valve controlled by the trip-off valve, said reel actuating means also comprising a rack and pinion, a cylinder and plunger for actuating the rack, the pressures in said cylinder, being controlled by the main valve, the reel carriage operating means comprising a return plunger and cylinder, a booster plunger and cylinder for communicating auxiliary force to the carriage in its cutting movement, means for arbitrarily adjusting the pressure delivered to the booster plunger, cushioning means for arresting the outward movement of the carriage, a spring actuated plunger for the initial starting the working stroke of the carriage to overcome inertia, and automatic, hydraulically controlled means for clamping the clay bar to the platen.

20. In a device of the character described, the combination with cutting reel and reel carriage and hydraulic means for actuating the same, including a piping system having a trip valve and a common controlling valve connected therewith, a clamping element, a spring control therefor, a hydraulic cylinder connected with the piping between said valves, and a plunger operating in the cylinder for actuating the clamping element against the force exerted by the spring.

HOWARD K. KING.